United States Patent

Wu et al.

[11] Patent Number: 6,022,248
[45] Date of Patent: Feb. 8, 2000

[54] CONNECTING TERMINAL HAVING ENHANCED BIASING FORCE

[75] Inventors: Kun-Tsan Wu, Tu-Chen; Song-Rong Chiou, Taipei Hsien, both of Taiwan

[73] Assignee: Hon Hai Precision Ind. Co., Ltd., Taipei Hsien, Taiwan

[21] Appl. No.: 09/127,233

[22] Filed: Jul. 31, 1998

[30] Foreign Application Priority Data

Sep. 4, 1997 [TW] Taiwan ................................. 86215270

[51] Int. Cl.⁷ ..................................................... H01R 4/48
[52] U.S. Cl. ............................................................. 439/862
[58] Field of Search ............................... 439/862, 66, 500

[56] References Cited

U.S. PATENT DOCUMENTS

| | | | |
|---|---|---|---|
| 1,257,917 | 2/1918 | Nero | 439/862 |
| 3,720,907 | 3/1973 | Asick | 439/636 |
| 5,626,500 | 5/1997 | Yoshimura | 439/862 |
| 5,746,626 | 5/1998 | Kwiat | 439/862 |

FOREIGN PATENT DOCUMENTS 1302412   7/1962   France ................................. 439/637

*Primary Examiner*—Khiem Nguyen
*Assistant Examiner*—Javaid Nasri

[57] ABSTRACT

A connecting terminal for use with a battery connector comprises a retaining section for attaching to a substrate. A first curved portion extends from the retaining section at a free end thereof. A first supporting portion extends from the first curved portion at a free end thereof. A second curved portion is formed at a free end of the first supporting portion, and a second supporting portion extends from the second curved portion. The second supporting portion forms a biasing end at an end thereof, and at least a reinforced rib is formed on one of the first and second curved portions thereby increasing the modulus of elasticity of the first curved portion.

1 Claim, 6 Drawing Sheets

CONNECTING TERMINAL HAVING ENHANCED BIASING FORCE

FIELD OF THE INVENTION

The present invention relates to a connecting terminal, and particularly to a connecting terminal having an enhanced biasing force for use with a battery connector for facilitating reliable electrical contact therewith.

DESCRIPTION OF THE PRIOR ART

Convenience provided by portable devices such as mobile phones, and laptop computers is essentially dependent on the power supplied from a battery mounted therein. As portable devices become increasingly compact, the battery cell or connector mounted thereon faces strict design requirements. Furthermore, all batteries have a limited lifespan and must be replaced when the power is exhausted, thus a terminal within the battery connector is subject to repeated depressions and extensions. If the terminal is not made from suitable resilient material or formed with an advantageous configuration, the terminal may develop material fatigue resulting in poor electrical contact between the terminal and the battery.

Conventionally, the battery terminal requires a positioning portion for attaching the terminal onto the printed circuit board and for providing a sufficient biasing base. However, this complicates the structure of the terminal and results in high manufacturing costs. U.S. Pat. Nos. 5,133,670 and 5,346,606 disclose such a terminal.

Furthermore, conventional battery terminals include a cantilever beam which can be either elongate, circular, or C-shaped. However, such a battery terminal has poor rigidity as well as flexibility, and may quickly fall victim to fatigue after a period of usage resulting in poor or ineffective electrical contact. Taiwan Utility Model Nos. 85205018 and 85205622, and U.S. Pat No. 5,487,674 disclose such a battery terminal.

For a battery connector, it is preferred to have a contacting terminal which can provide low insertion resistance when a mating backplane such as a terminal of a battery initially contacts therewith. In addition, when the backplane reaches a final position, the contacting terminal should provide an enhanced biasing force to ensure continuous electrical contact therebetween. However, existing terminals fail to achieve this goal.

SUMMARY OF THE INVENTION

An objective of the present invention is to provide a connecting terminal for use with a battery connector, having a retaining section and a contacting section with different modulus of elasticity thereby facilitating insertion of a battery and providing reliable contact between the battery connector and a terminal of the battery.

Another objective of the present invention is to provide an adaptable connecting terminal having a reinforced rib on a contacting section thereby increasing the modulus of elasticity thereof which results in a reliable electrical contact with a terminal of a battery.

In order to achieve the objectives set forth, the connecting terminal comprises a retaining section for surface mounting to a printed circuit board, and a connecting section extending from a free end of the retaining section. The connecting portion forms a curved portion having a biasing tab extending downward and toward the retaining section. At least a reinforced rib extends along the curved portion thereby increasing the biasing force of the curved portion after the biasing tab contacts the retaining section.

Still in accordance with another aspect of the present invention, a battery connector comprises a dielectric housing defining at least a receiving chamber therein, and an adaptable connecting terminal is seated within the receiving chamber. The adaptable connecting terminal comprises a retaining section for attaching the terminal to the receiving chamber, and a connecting section extending from a free end of the retaining section. The connecting portion forms a curved portion having a biasing tab extending downward and toward the retaining section. At least a reinforced rib extends along the curved portion thereby increasing the biasing force of the curved portion after the biasing tab contacts with the retaining section.

These and additional objects, features, and advantages of the present invention will become apparent after reading the following detailed description of the preferred embodiment of the invention taken in conjunction with the appended drawings.

DETAILED DESCRIPTION OF THE PREFERRED EMBODIMENT

Figure 3:
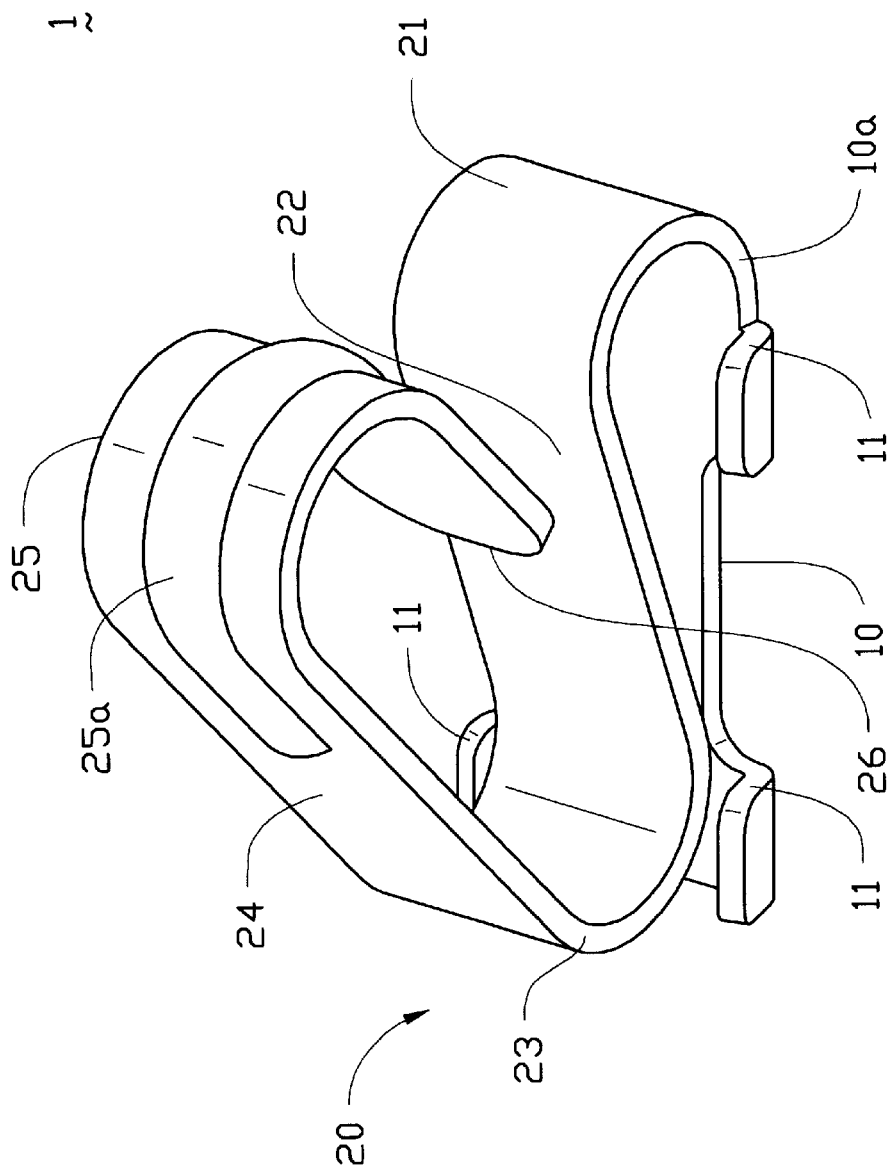
FIG. 3 is a perspective view of a preferred embodiment of an adaptable connecting terminal.

Referring to FIG. 3, a connecting terminal 1 formed from an elongate conductive strip such as copper, comprises a retaining section 10 and a contacting section 20 resiliently connected to an end 10a of the retaining section 10. The retaining section 10 includes a plurality of retaining fins 11 extending transversely outward therefrom. The retaining section 10 may be attached to a printed circuit board by a soldering process or may be retained in a dielectric housing by means of the retaining fins 11 (see FIG. 1).

The contacting section 20 includes a first curved joint 21 connected to one end 10a of the retaining section 10. A first supporting section 22 extends outward and downward from the first curved joint 21. A second curved joint 23 is formed adjacent to the supporting section 22 and above the retaining section 10. A spring member 24 having a biasing end 25 is resiliently connected to the second curved joint 23. A biasing tab 26 extends outward and downward from the biasing end 25 and is spaced from the supporting section 22. The biasing end 25 further forms a reinforced rib 25a extending along the biasing end 25 and a portion of the biasing tab 26. Since the reinforced rib 25a projects upwardly, it provides an enhanced electrical contact with a terminal 41 (FIG. 5) while increasing the modulus of elasticity of the biasing end 25.

Figure 5:
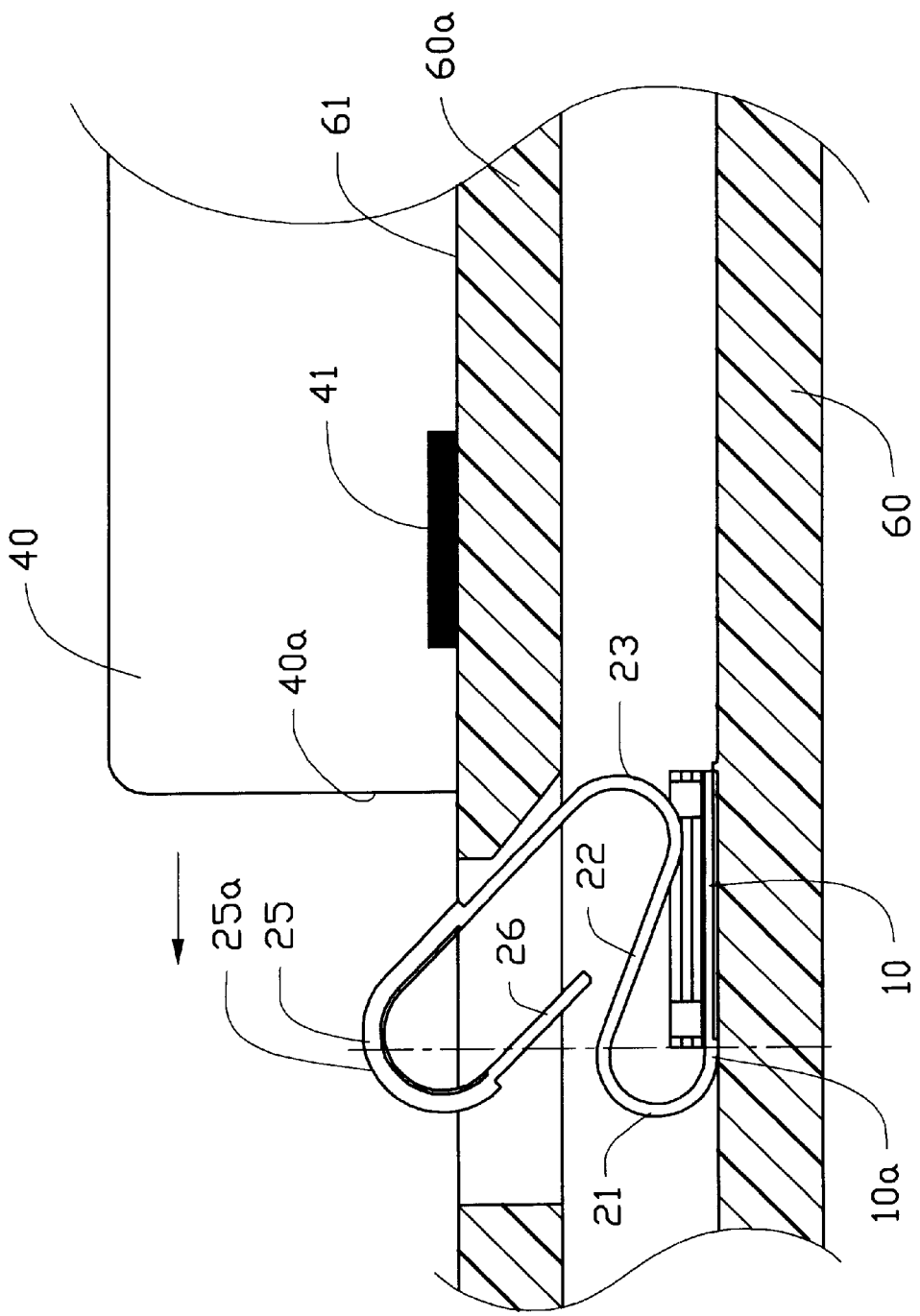
FIG. 5 is a cross sectional view showing the connecting terminal soldered onto a first substrate and partially projecting through a second substrate.

Referring to FIG. 5, a battery pad 40 for electrically contacting with the connecting terminal 1 is shown. The retaining section 10 is soldered onto a first substrate 60 whereby the biasing end 25 projects beyond an upper surface 61 of a second substrate 60a. When a leading end 40a of the battery pad 40 initially contacts the biasing end 25, the biasing end 25 rotates about the second curved joint 23 having normal modulus of electricity. In this case, the biasing tab 26 does not contact with the supporting section 22 and the second curved joint 23 is above the retaining section 10. As a result, the battery pad 40 may smoothly and easily move against the connecting terminal 1.

As the battery pad 40 continuously moves to a point where the biasing tab 26 contacts the supporting section 22 and the second curved joint 23 contacts substantially with the retaining section 10, the biasing end 25 exerts an increased contacting force on a backplane (not labeled) or the terminal 41 of the battery pad 40. When the battery pad 40 reaches a final position, the biasing end 25 rests on the first curved joint 21, and the increased modulus of electricity of the biasing end 25 due to the reinforced rib 25a prevents the biasing end 25 from deforming further in addition to providing a solid and enhanced electrical contact between the biasing end 25 and the terminal 41 of the battery pad 40.

Figure 1:
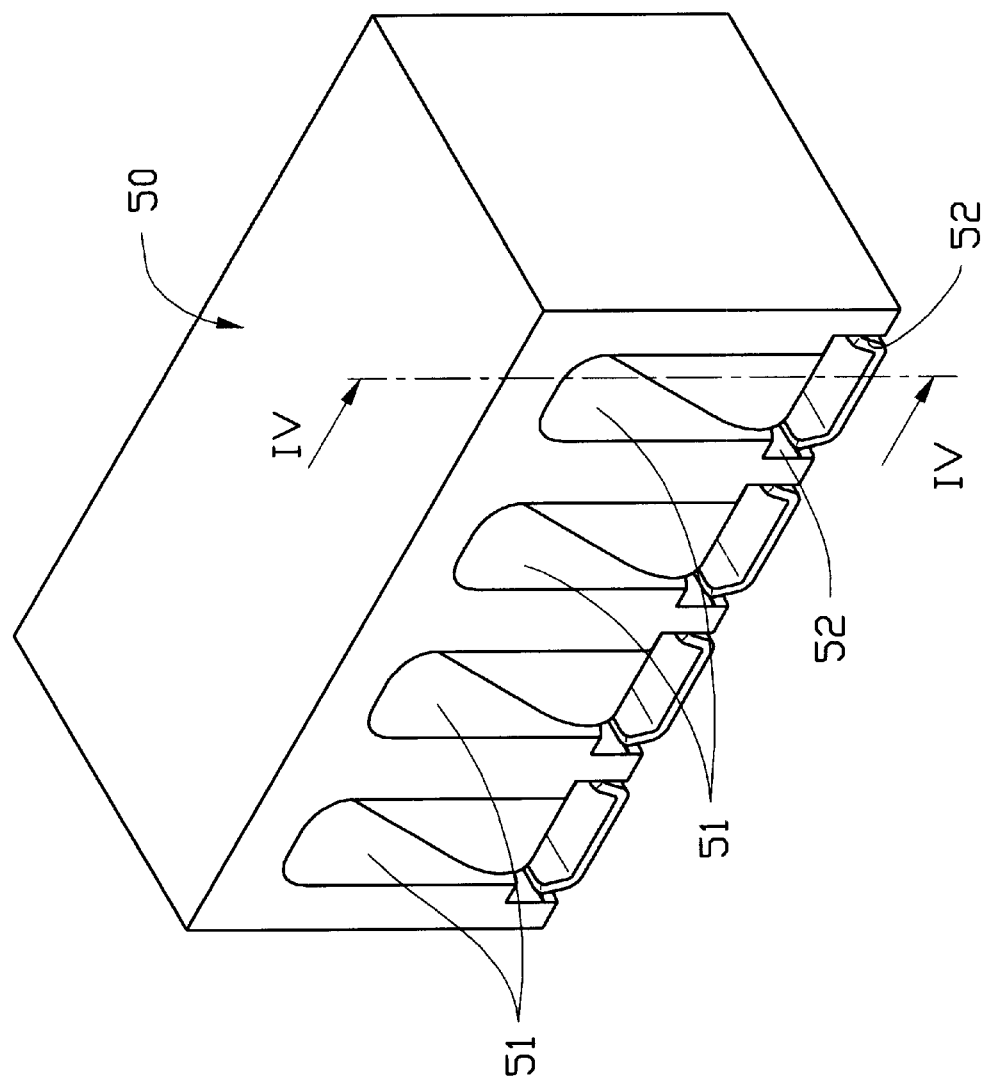
FIG. 1 is a perspective view of a battery housing received in a battery terminal in accordance with the present invention.
Figure 2:
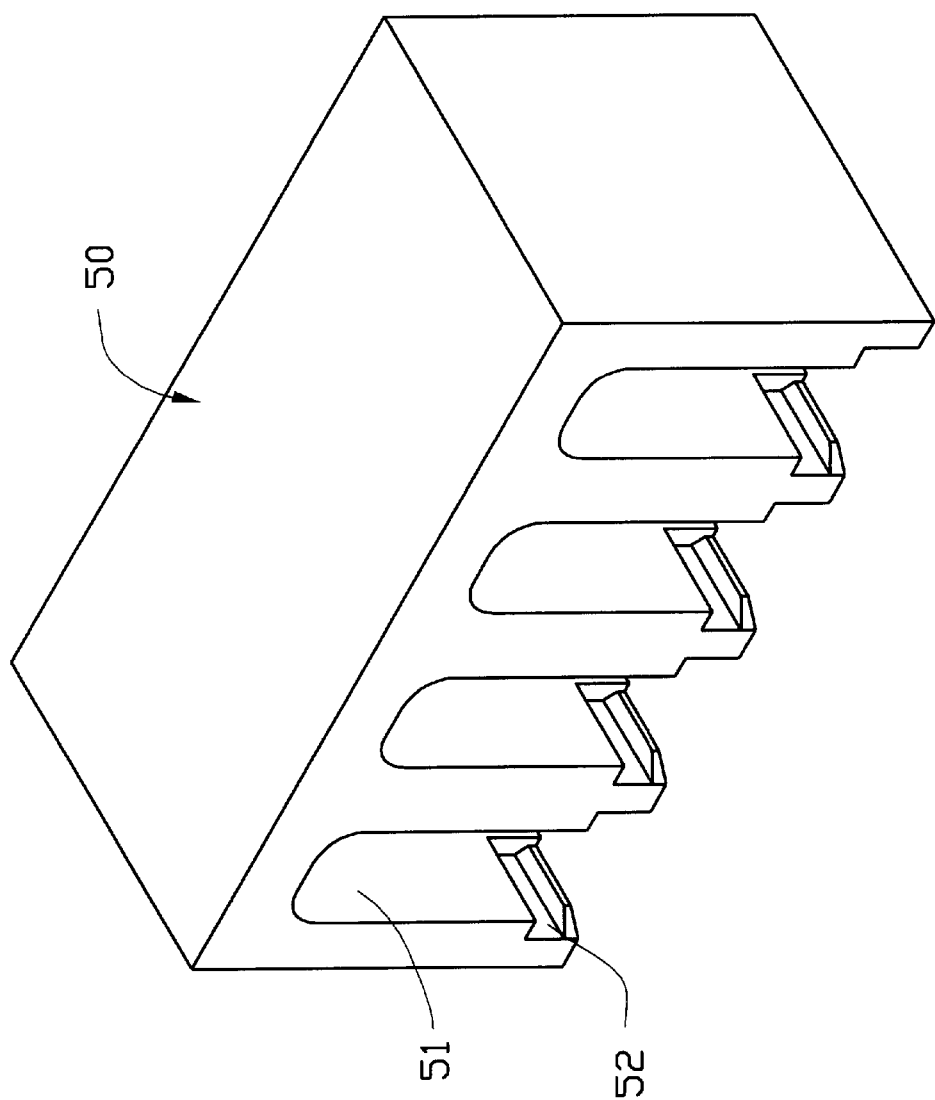
FIG. 2 is a perspective view of the battery housing of FIG. 1.

Referring to FIGS. 1, 2 and 3, a dielectric housing 50 having a plurality of receiving chambers 51 for use with the connecting terminal 1 is provided. Each receiving chamber 51 includes a pair of retaining grooves 52 for retaining the retaining fins 11 of the retaining section 10. By this arrangement, each chamber 51 may receive and retain a connecting terminal 1 therein.

Figure 4:
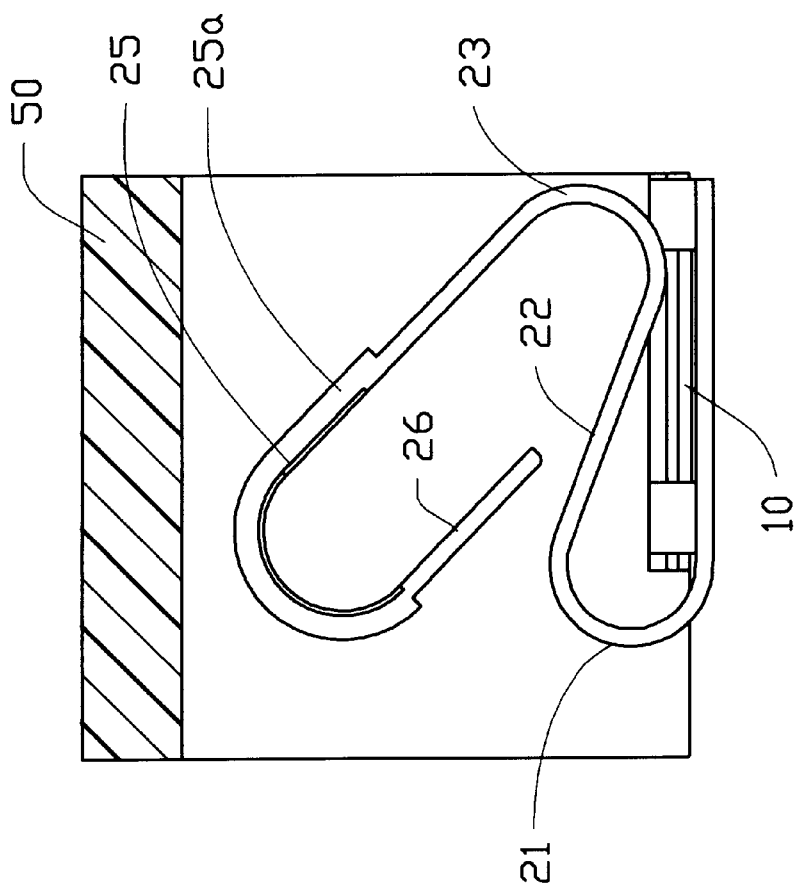
FIG. 4 is a cross sectional view of the battery connector of FIG. 1.

FIG. 4 is a cross sectional view of the receiving chamber 51 showing a connecting terminal 1 retained therein.

It should be noted that the housing 50 may be removed from the connecting terminals 1 after the terminals 1 have been soldered onto the first substrate 60 for cooperation with the second substrate 61 which is adapted to be disposed above the first substrate 60. In other words, the housing 50 may function as a tool to facilitate soldering the individual terminals unto the first substrate 60. Afterwards, the housing 50 should be separated from the soldered terminals 1 to allow the second substrate 60a to be installed above the first substrate 60 and let the biasing ends 25 of the terminals 1 projecting above the second substrate 60a. Therefore, the housing 50 with the associated terminals 1 is substantially of an intermediate product which can be used in manufacturing the final product.

Figure 6:
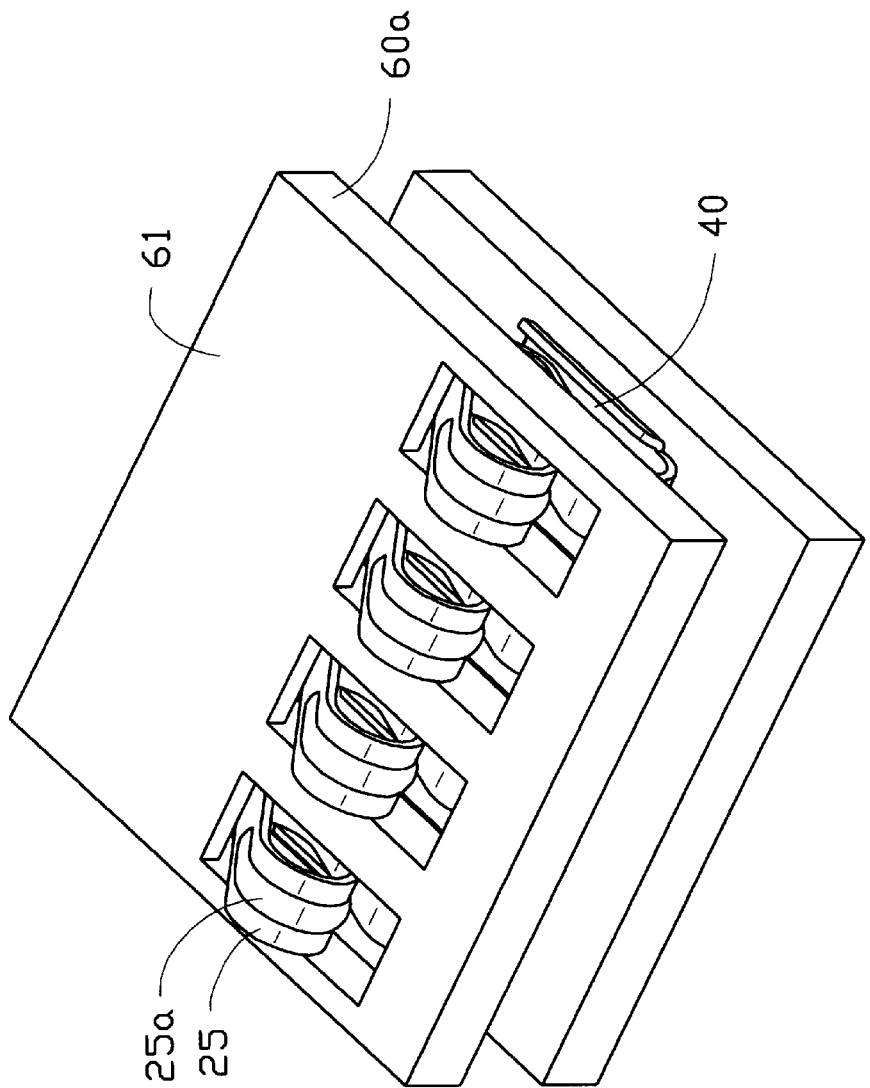
FIG. 6 is a schematic illustration of FIG. 5.

FIG. 6 is a perspective view of the embodiment shown in FIG. 5 wherein each biasing end 25 extends through the corresponding aperture (not numbered) of and projects beyond the upper surface 61 of the substrate 60a in a case (not shown) of the specific portable device such as a mobile phone or a laptop computer, whereby the battery pad 40 moves along the upper substrate 60.

While the present invention has been described with reference to a specific embodiment, the description is illustrative of the invention and is not to be construed as limiting the invention. Various modifications to the present invention can be made to the preferred embodiment by those skilled in the art without departing from the true spirit and scope of the invention as defined by the appended claims.

Therefore, persons of ordinary skill in this field are to understand that all such equivalent structures are to be included within the scope of the following claims.

We claim:

1. A connecting terminal, comprising:

a retaining section for attaching to a substrate and having a first curved joint extending from an end thereof;

a first supporting portion extending from said first curved joint and forming a second curved joint thereof;

a spring member extending from said second curved portion, and forming a biasing end at an end thereof; and a biasing tab extending downward and outward from said biasing end and dimensioned to be adapted to be engaged with the first supporting portion when the terminal is fully deflected, whereby when a battery initially contacts the biasing end, the biasing end rotates about the second curved portion wherein the biasing tab does not contact with the first supporting portion and the second curved portion is spaced above the retaining section; whereby when said battery continuously moves with regard to the biasing end, the biasing tab contacts the first supporting portion and the second curved joint contacts the retaining section.

* * * * *